United States Patent
Thomassen

(10) Patent No.: US 6,452,536 B1
(45) Date of Patent: *Sep. 17, 2002

(54) ANTENNA SYSTEM

(75) Inventor: Sierk Michael Thomassen, Borne (NL)

(73) Assignee: Hollandse Signaalapparaten B.V., Hengelo (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/486,724

(22) PCT Filed: Aug. 26, 1998

(86) PCT No.: PCT/EP98/05503

§ 371 (c)(1),
(2), (4) Date: Mar. 9, 2000

(87) PCT Pub. No.: WO99/13354

PCT Pub. Date: Mar. 18, 1999

(30) Foreign Application Priority Data

Sep. 9, 1997 (NL) .............................................. 1006980

(51) Int. Cl.[7] .............................................. G01S 13/87
(52) U.S. Cl. ............................ 342/74; 342/88; 342/368
(58) Field of Search .............................. 342/74, 80, 81, 342/82, 88, 368, 374, 383; 343/853, 893

(56) References Cited

U.S. PATENT DOCUMENTS 3,858,206 A * 12/1974 Scheidler et al. ............. 342/83
5,543,811 A * 8/1996 Chethik ...................... 343/853

FOREIGN PATENT DOCUMENTS

EP 0440200 A2 * 1/1990

* cited by examiner

Primary Examiner—Ian J. Lobo
(74) Attorney, Agent, or Firm—Oblon, Spivak, McClelland, Maier & Neustadt, P.C.

(57) ABSTRACT

A method for scheduling radar transmissions for a phased array antenna system having at least two antenna faces, in which each respective antenna face is configured to receive echoes of possible targets corresponding to previous radar transmissions by the respective antenna face. The method includes determining, based on a list of requested radar transmissions, a scheduling process including starting times of radar transmissions for each of the antenna faces for substantially each radar transmission included in the list of requested radar transmissions. Further, the scheduling process is arranged such that the antenna faces are used substantially simultaneously, transmission by an antenna face is prevented when another antenna face is about to receive echoes corresponding to possible targets, and radar transmissions for each antenna face end at substantially the same time. In addition, radar transmissions for the antenna faces are substantially mutually synchronized.

8 Claims, 3 Drawing Sheets

ANTENNA SYSTEM

BACKGROUND OF THE INVENTION

1. Field of the Invention

The invention relates to a method for scheduling radar transmissions for a phased array antenna system comprising at least two antenna faces where, after a radar transmission, each antenna face receives echoes, originating from that radar transmission, of possible targets and where, on the basis of a list of requested radar transmissions, an antenna face and a starting moment are determined for at least substantially each radar transmission.

2. Discussion of the Background

Phased array antenna systems as such are well-known in the art and are for instance used on board naval ships for a considerable number of tasks which, until recently, required the availability of several separate fire-control and surveillance radar systems.

With multi-face phased array antennas, it is preferably assumed that radar transmissions for the various antenna faces can be scheduled independently. In this respect, a more specific assumption is that transmission by one antenna face and reception by another antenna face may coincide, or worded differently, that the insulation between the various antenna faces is satisfactory. Broadly speaking, this is true: it is possible to design the antenna faces such that the side lobe level is kept to a minimum, thus providing a sufficient insulation for any combination of beam directions.

The installation of the phased array antenna system on board a ship may alter the situation. If a large object, a ferry-boat for instance, is irradiated by two different antenna faces simultaneously, which is possible, as beams generated by two adjacent antenna faces will generally overlap to a slight extent, the infeasibility of coincident transmission and reception can be readily ascertained. This problem may also arise for less powerful reflectors and can be easily solved by scheduling the transmissions for adjacent antenna faces in such a manner that the beams are not parallel or not substantially parallel and by stipulating a predetermined frequency difference for transmissions for adjacent antenna faces. Notwithstanding these measures, the antenna face side lobes and the presence of a powerful reflector in the vicinity of the antenna system are still found to cause crosstalk from one antenna face to another.

An ineffectual way to solve this problem is to use only one antenna face at a time. This restricts the number of tasks to be performed by the antenna system to such an extent that the concept should no longer be considered viable.

SUMMARY OF THE INVENTION

The present invention provides a solution to the problem without any noticeable degradation of the performance of the antenna system and is characterized in that the scheduling process is arranged such that the antenna faces are used at least substantially simultaneously and that transmission by an antenna face at the moment that another antenna face is about to receive echoes of possible targets is prevented.

According to a first embodiment of the invention, the priorities assigned to the radar transmissions may vary, which may be convenient in the event of crosstalk or imminent crosstalk. It is thereto characterized in that an antenna face engaged in a high-priority radar transmission may interrupt a lower-priority radar transmission performed by an adjacent antenna face at the moment that echoes of possible targets are anticipated.

Crosstalk or imminent crosstalk may for instance be ascertained with the aid of a correlator, as described in the Netherlands patent specification 1006812, which patent specification herewith is incorporated by reference.

An advantageous embodiment of the inventive method according to which it is not required to know the positions of possible targets is characterized in that radar transmissions for the various antenna faces take place at least substantially mutually synchronized.

Another advantageous embodiment of the inventive method, which all the time ensures a maximum available listening time is characterized in that radar transmissions for the various antenna faces are scheduled such that the radar transmissions end at least substantially simultaneously.

Yet another advantageous embodiment of the method is based on the observation that a requested radar transmission has a certain degree of flexibility. It is not always necessary for the pulse repetition frequency, the PRF, to be chosen accurately, it will often suffice to stipulate that a PRF is contained in a certain frequency interval. Sometimes there may even be several frequency intervals that are suitable. The same applies to the radar transmit frequency, the RF. Although the RP is often chosen dependent on the PRF with a view to Doppler processing, only a limited number of values is found to be unsuitable. Also the moment on which a transmission is to take place is not entirely fixed, although in general there is an expiration time: the moment before which the transmission must be completed. This inventive embodiment of the invention is therefore characterized in that each requested radar transmission is represented by a realization space which contains at least substantially all acceptable realizations of the transmission. A priority assigned to the transmission and an expiration time have been determined unequivocally and a large number of possible PRF, RF pairs are available.

Yet another embodiment of the invention is characterized in that per antenna face, a group of requested radar transmissions, intended for that antenna face, is selected from the list of requested radar transmissions on the basis of their priorities and that per group, the realizations of the requested radar transmissions are scheduled such that the requested radar transmissions can for all antenna faces be realized with an identical PRF at least substantially at any moment.

It frequently occurs that a requested radar transmission can be realized by more than one antenna face, for instance because the range in azimuth of two adjacent antenna plates shows a certain degree of overlap. Usually, one realization of the requested radar transmission is noticeably superior, sometimes, however, both realizations are acceptable. Yet another embodiment of the invention makes use of this possibility and is characterized in that, if a group contains a radar transmission that can also be realized by another antenna face, this radar transmission is included in the group pertaining to the other antenna face after which, per group, the realizations of the requested radar transmissions are scheduled such that the requested radar transmissions can for all antenna faces again be realized with an identical PRF at least substantially at any moment.

Generally, a number of feasible time schedules will thus be generated, all of which are in fact suitable. Another advantageous embodiment is characterized in that from the variety of possible schedules, the schedule that ensures the most optimal utilization of all antenna faces is always selected.

Once all requested radar transmissions have been assigned to groups thus scheduled, the groups are written into a buffer memory for further processing.

A drawback in scheduling the groups is the absence of a good scheduling strategy. Consequently, an absolutely optimal schedule is never obtained. A longer search procedure will however yield a more feasible schedule. Yet another advantageous embodiment of the invention is characterized in that the generation of possible schedules is ceased when the buffer memory is at least substantially empty and that the best feasible schedule is selected from the schedules which are available at that moment.

BRIEF DESCRIPTION OF THE DRAWINGS

The invention will now be described in greater detail with reference to the following figures, of which.

DESCRIPTION OF THE PREFERRED EMBODIMENTS

Figure 1:
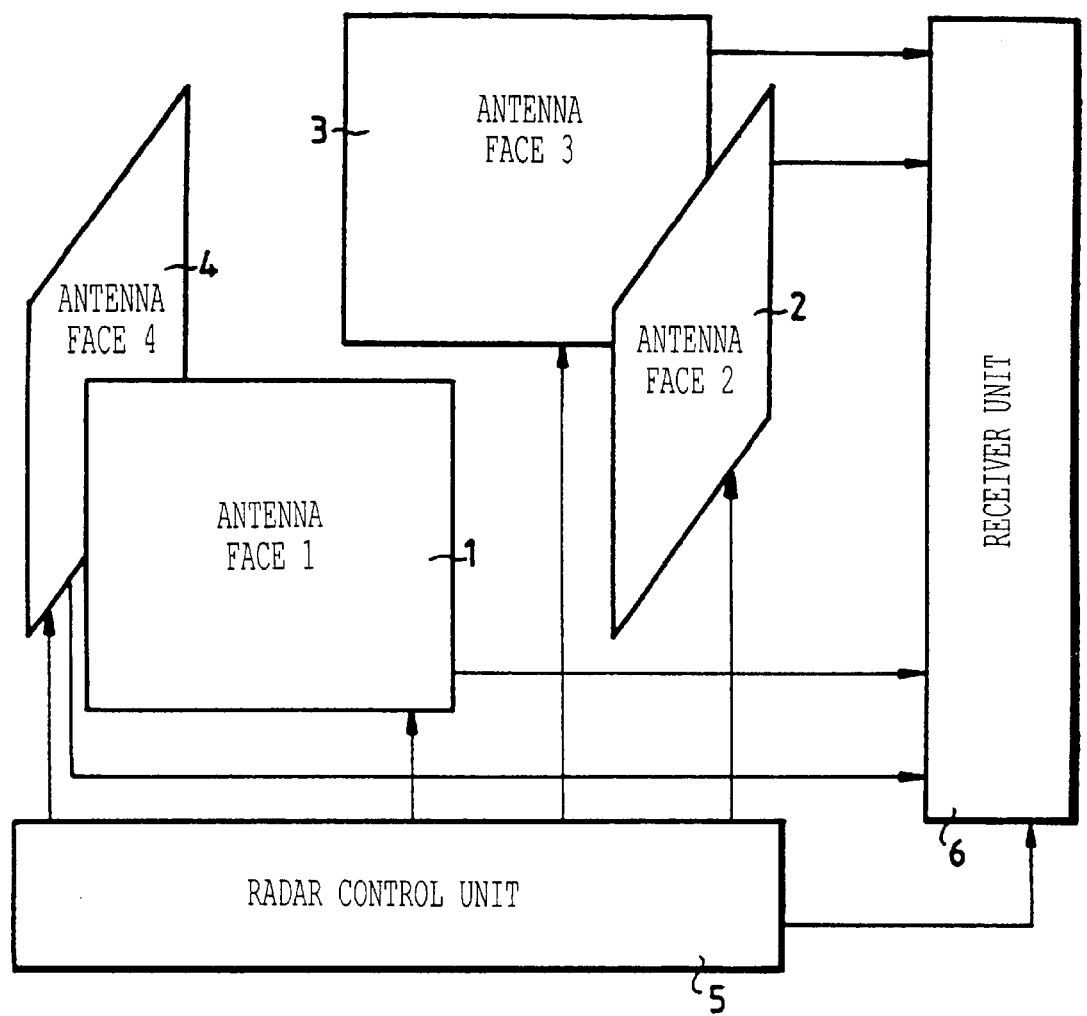
FIG. 1 schematically represents a four-face phased array antenna system.

FIG. 1 schematically represents a phased array antenna system comprising four antenna faces 1, 2, 3, 4 suitable for shipboard applications and jointly providing a 360degree azimuthal coverage. Antenna faces 1, 2, 3, 4 each receive input signals and control signals from a control unit 5 and pass the echo signals received to a receiver unit 6 for further processing.

Antenna faces 1, 2, 3, 4 may be active or passive. Active antenna faces are obtained by an array of active T/R modules, each provided with an RF power amplifier for the transmit function, an LNTA for the receive function and an adjustable phase shifter. Passive antenna faces are obtained by an array of passive T/R modules which usually only comprise an adjustable phase shifter.

Control unit 5 furthermore passes control signals to receiver unit 6, such that receiver unit 6 always knows when an antenna face is about to initiate a certain type of transmission.

Figure 2:
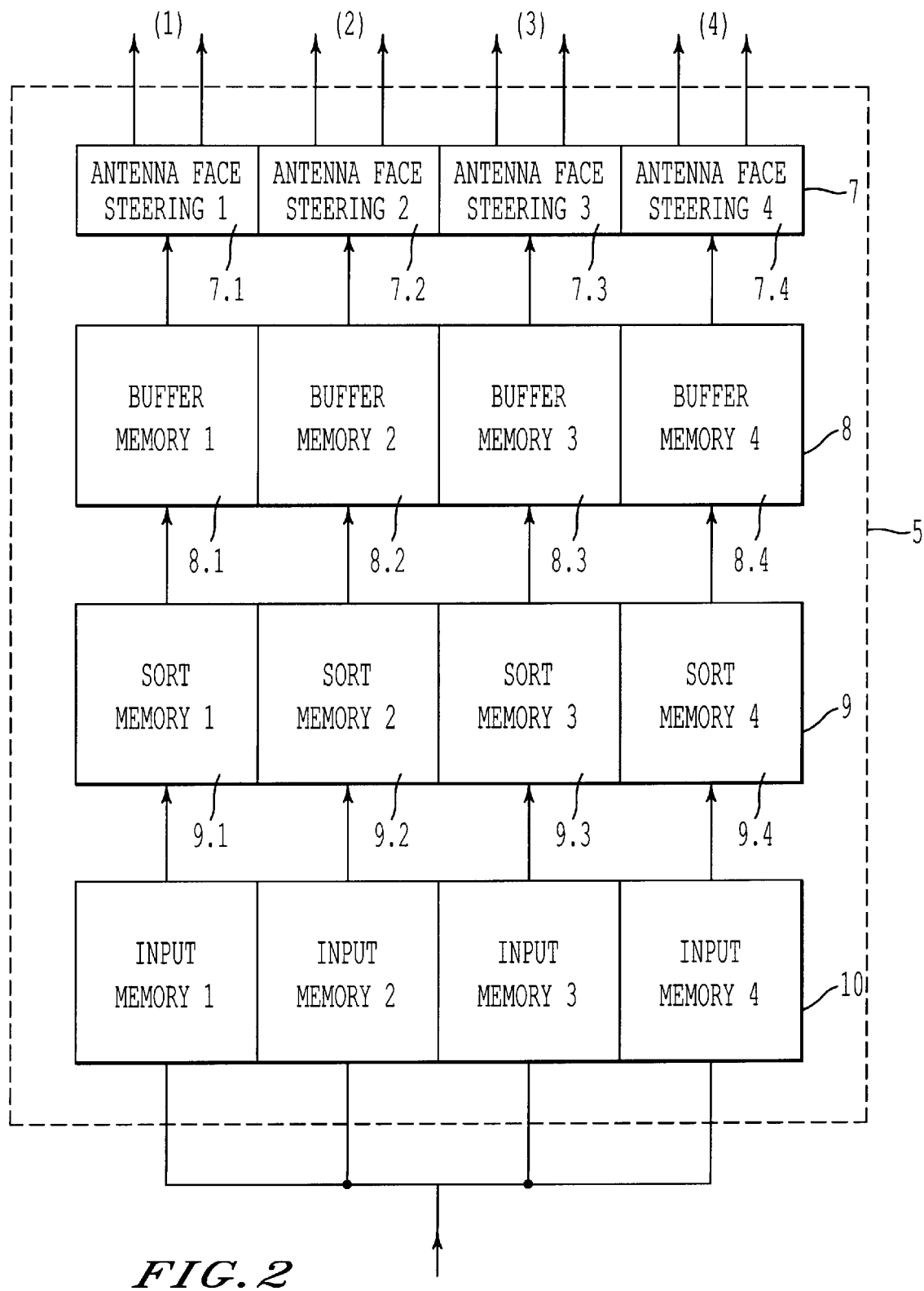
FIG. 2 schematically represents a control unit for a four-face phased array antenna system.

FIG. 2 schematically represents a radar control unit 5 incorporated in a four-face phased array antenna system.

Radar control unit 5 comprises four antenna face steerings 7.1, 7.2, 7.3, 7.4, each of which controls one antenna face 1, 2, 3, 4. The actual steering comprises a first connection via which a direction in azimuth and elevation for the antenna face in question is transmitted and a second connection which passes a single RF pulse or a burst of RF pulses. Control commands for the antenna face steerings 7.i are successively retrieved from a buffer memory 8 every time that all antenna face steerings have completed a preceding transmission.

According to the invention, all antenna face steerings employ the same PRF. In effect, this means that the control commands shall be available in buffer memory 8 in an ordered way, such that the four control commands which are simultaneously retrieved from buffer memory 8 for the four antenna faces actually have the same PRF. The antenna face steerings are furthermore so designed that the trailing edges of the RF pulses emitted per antenna face will always coincide, for instance by taking this joint trailing edge as reference point and by subsequently timing the pulses to be emitted from this point. This has the advantage that the full listening time is available for each antenna face.

The control commands stored in buffer memory 8 and arranged according to PRF are thus sequentially processed by the antenna face beam steering units 7.1, 7.2, 7.3, 7.4. The buffer memory 8 is filled group by group from a sort memory 9 in which the transmissions are sorted according to PRF, or more specifically, according to corresponding PRF realizations. Sort memory 9 in turn is filled from an input memory 10 in which the user of the phased array radar system writes requested radar transmissions.

According to the invention, a requested radar transmission is characterized by a priority, an expiration time before which the transmission shall be effected, a direction in azimuth and elevation, a type of transmission and at least one antenna face capable of realizing the transmission. The type of transmission in turn defines at least one PRF range within which the PRF shall be realized, an associated RF range, a pulse length and a number of pulses to be emitted. To simplify the complex sorting process, a selection can be made from a number of standard transmissions, for instance:

1 pulse, 3, 10 or 100 microseconds 3 pulses, 3, 10 or 100 microseconds, PRF 1.8–2.2 KHz 16 pulses, 3, 10 or 100 microseconds, PRF 4.5–5.5 KHz 32 pulses, 3, 10 or 100 microseconds, PRF 9–11 KHz.

In addition to the PRF, an RF is per transmission specified by the user in a manner known with a view to avoiding blind speeds or, more generally, enabling a good Doppler processing. The RF need not be considered in the sorting process, although once a decision has been made in favour of a certain PRF realization, the RF will be determined on the basis of this decision.

At the start of the sorting process, a group of requested transmissions is selected from input memory 10 and written into sort memory 9, preferably a similar number per antenna face. The group is selected on the basis of the priority of the requested transmissions and on their expiration times. The foremost aim is to process all transmissions from a certain priority onwards in due time. The relevant priority in this respect is determined on the basis of the instantaneous pressure. The requested transmissions may already be available in input memory 10, ordered per antenna face, or they may during the transfer from input memory 10 to sort memory 9 be ordered for each antenna face. The result is that at the start of the sorting process, the group is available, in the form of four subgroups, one for each antenna face, in memories 9.1, 9.2, 9.3, 9.4.

The sorting process is started with a certain random order in for instance memory 9.1 and a procedure is started to find matching requested transmissions in the other memories 9.i, during which continuous attempts are made to find PRF realizations such that the four antenna faces transmit at the same PRF or, if so required, do not transmit at all. Attempts will of course be made to create a situation in which all antenna faces can be active at practically any moment. At the end of the sorting process, sort memory 9 reveals a certain order on the basis of which the utilization ratio of all antenna faces can be easily ascertained.

Subsequently, if time permits, the requested transmissions are interchanged in memory 9.1, for instance randomly, after which the sorting process is resumed. This may result in a more optimal order with a higher utilization ratio. This process may be repeated several times, each time retaining the most optimal order.

Several requested transmissions can be realized by more than one antenna face. It may then be advantageous to transfer such a transmission from for instance memory 9.i to memory 9.j and to repeat the sorting operations several times as described above. This may result in a more optimal order.

By constantly retaining the most optimal order, an optimal scheduling of realizations of requested transmissions is always available at the moment that the buffer memory 8 threatens to become empty. These realizations constitute the new set of control commands with which buffer memory 8 is completed. Sort memory 9 is filled with a new group of requested transmissions after which the sorting process can be resumed.

For the purpose of Doppler processing, a requested radar transmission made up of a number of pulse bursts is sometimes inevitable, each pulse burst having a slightly different, small PRF range. In addition, the bursts should follow each other in rapid succession. In that case, the above-mentioned sorting process remains applicable to the fullest extent, although in changing the related bursts should remain mutually coupled.

Figure 3:
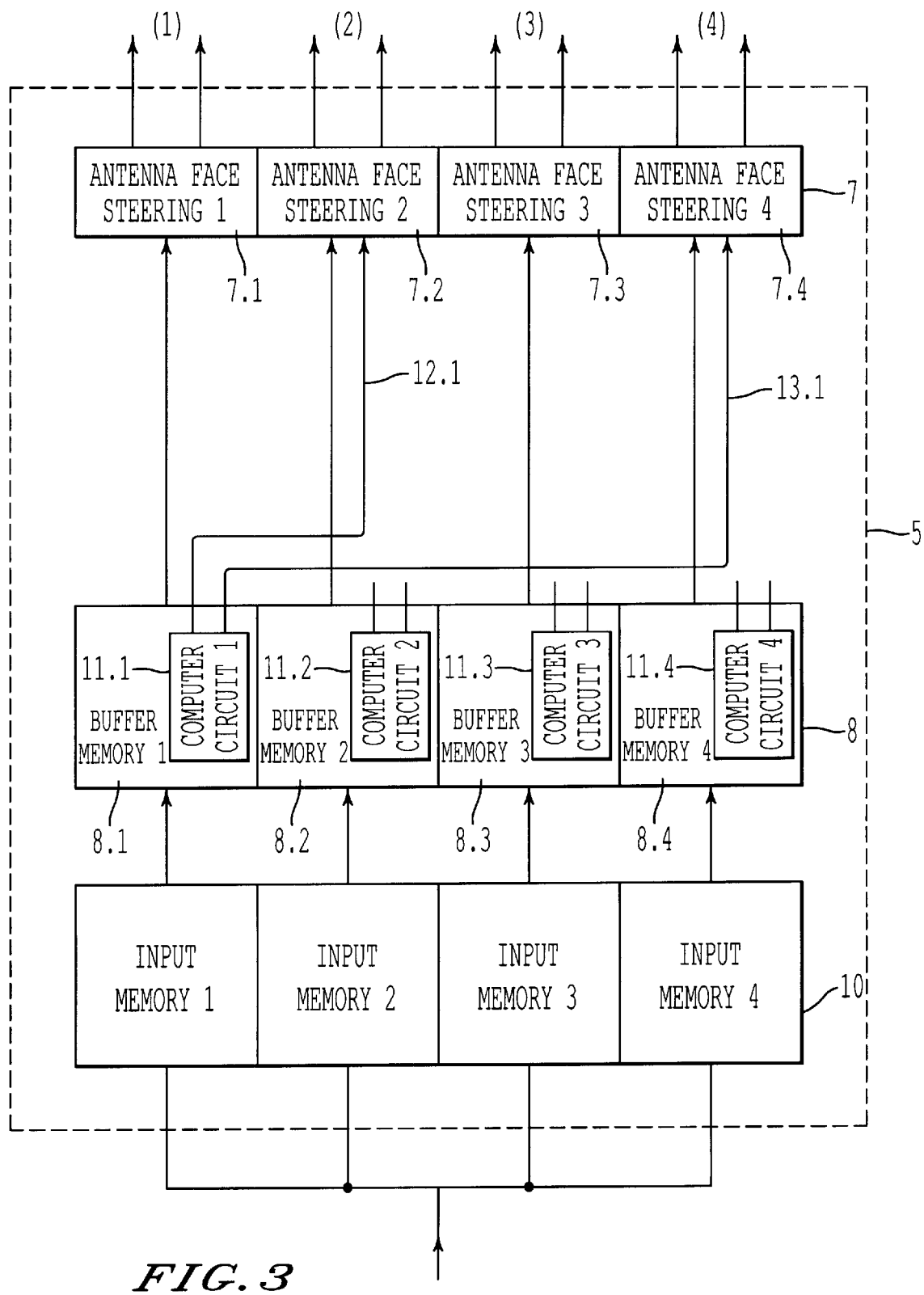
FIG. 3 schematically represents an alternative control unit for a four-face phased array antenna system.

FIG. 3 schematically represents an alternative radar control unit 5 incorporated in a phased array antenna system. Radar control unit 5 comprises an input memory 10 into which the user of the phased array antenna writes the requested radar transmissions per antenna face. Each radar transmission is characterized by a priority, a direction in azimuth and elevation and a type of transmission. The type of transmission in turn defines one PRF, one RF, a pulse length and a number of pulses to be emitted. Additionally, a time gate may be defined, i.e. a time interval measured from the trailing edge of a corresponding radar transmitter pulse in which a radar echo is expected. This is of particular importance for a radar transmission pertaining to a track process where the position of a target is approximately known.

Radar control unit 5 furthermore comprises a buffer memory 8 which, on the basis of the requested radar transmissions, is filled from input memory 10. Buffer memory 8 is divided into the subbuffers 8.1, 8.2, 8.3, 8.4, each of which controls one antenna steering 7.*i*. According to the invention, subbuffer 8.1 also comprises a comparator circuit 11.1 which, at least for radar transmissions for which a time gate has been defined, compares the priority of the radar transmission to the priorities of the radar transmissions on the adjacent antenna faces. If the priority assigned to the radar transmission exceeds that of a radar transmission of an adjacent antenna face, the latter transmission is blanked for the duration of the time gate by means of blanking signals 12.1 and 13.1. Analogously, subbuffers 8.2, 8.3, 8,4 are likewise provided with comparator circuits 11.2, 11.3, 11.4 which, if required, blank the radar transmissions of adjacent antenna faces.

This embodiment is particularly advantageous if the phased array antenna system is designed to emit both long and short pulses, with the long pulses usually employed for search transmissions and the short pulses for track transmissions. By assigning a higher priority to a track transmission than to a search transmission, the crosstalk-free reception of echoes originating from a track transmission can be ensured, whereas the adverse effect of a brief interruption of a long search transmission is negligible.

What is claimed is:

1. A method for scheduling radar transmissions for a phased array antenna system having at least two antenna faces, each respective antenna face of the at least two antenna faces configured to receive echoes of possible targets corresponding to previous radar transmissions by said each respective antenna face, and said method comprising:

determining, based on a list of requested radar transmissions, a scheduling process including starting times of radar transmissions for each of the at least two antenna faces for substantially each radar transmission included in the list of requested radar transmissions, wherein the scheduling process is arranged such that the at least two antenna faces are used substantially simultaneously, transmission by a first antenna face of the at least two antenna faces is prevented when a second antenna face of the at least two antenna faces is about to receive echoes corresponding to possible targets, and trailing edges of first and second radar transmissions for each of the at least two antenna faces are aligned so the first and second radar transmissions end at substantially the same time even when the first and second radar transmissions begin at different times, and wherein radar transmissions for the at least two antenna faces are substantially mutually synchronized.

2. The method as claimed in claim 1, wherein an antenna face engaged in a high-priority radar transmission interrupts a lower-priority radar transmission preformed by an adjacent antenna face when echoes of possible targets are anticipated to be received by the antenna face engaged in the high-priority radar transmission.

3. The method as claimed in claim 1, wherein transmission parameters for performing each requested radar transmission included in the list of requested radar transmissions are flexibly determined from all acceptable performance parameters.

4. The method as claimed in claim 3, wherein per respective antenna face, a group of requested radar transmissions intended for the respective antenna face is selected from the list of requested radar transmissions based on priorities of the requested radar transmissions, and that per group, the transmission parameters for the requested radar transmissions are determined and scheduled so the radar transmissions for the at least two antenna faces have a same pulse repetition frequency.

5. The method as claimed in claim 4, wherein, if a group contains a radar transmission that can also be performed by another antenna face, the radar transmission is transferred to the group pertaining to the other antenna face after which, per group, the transmission parameters for the requested radar transmissions can again be determined and scheduled so the radar transmissions for the at least two antenna faces have a same pulse repetition frequency.

6. The method as claimed in claims 4 or 5, wherein from a variety of possible schedules, a schedule that ensures the most optimal utilization of all antenna faces is always selected.

7. The method as claimed in claim 6, wherein the scheduled groups are written into a buffer memory included in the phased array antenna system for further processing.

8. The method as claimed in claim 7, wherein a generation of possible schedules is stopped when the buffer memory is substantially empty and a best feasible schedule is selected from the generation of possible schedules.

* * * * *

UNITED STATES PATENT AND TRADEMARK OFFICE
CERTIFICATE OF CORRECTION

PATENT NO. : 6,452,536 B1
DATED : September 17, 2002
INVENTOR(S) : Thomassen

It is certified that error appears in the above-identified patent and that said Letters Patent is hereby corrected as shown below:

<u>Title page,</u>
Item [73], Assignee should read:
-- [73] Assignee: Thales Nederland B.V., Hengelo (NL) --

Signed and Sealed this

Twentieth Day of May, 2003

JAMES E. ROGAN
*Director of the United States Patent and Trademark Office*